US009677194B2

(12) United States Patent
Lebl et al.

(10) Patent No.: US 9,677,194 B2
(45) Date of Patent: Jun. 13, 2017

(54) MICROFABRICATION METHODS FOR THE OPTIMAL PATTERNING OF SUBSTRATES

(71) Applicant: ILLUMINA, INC., San Diego, CA (US)

(72) Inventors: Michal Lebl, San Diego, CA (US); David L. Heiner, San Diego, CA (US); Chanfeng Zhao, San Diego, CA (US); David L. Barker, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 0 days.

(21) Appl. No.: 13/707,337

(22) Filed: Dec. 6, 2012

(65) Prior Publication Data

US 2013/0096034 A1   Apr. 18, 2013

Related U.S. Application Data

(62) Division of application No. 12/665,652, filed as application No. PCT/US2008/067402 on Jun. 18, 2008.

(60) Provisional application No. 60/936,287, filed on Jun. 18, 2007.

(51) Int. Cl.
C40B 50/06 (2006.01)
B01J 19/00 (2006.01)
C40B 40/06 (2006.01)
C40B 50/14 (2006.01)

(52) U.S. Cl.
CPC .......... *C40B 50/06* (2013.01); *B01J 19/0046* (2013.01); *C40B 40/06* (2013.01); *C40B 50/14* (2013.01); *B01J 2219/00317* (2013.01); *B01J 2219/00497* (2013.01); *B01J 2219/00585* (2013.01); *B01J 2219/00596* (2013.01); *B01J 2219/00605* (2013.01); *B01J 2219/00648* (2013.01); *B01J 2219/00659* (2013.01); *B01J 2219/00677* (2013.01); *B01J 2219/00722* (2013.01); *B01J 2219/00725* (2013.01)

(58) Field of Classification Search
None
See application file for complete search history.

(56) References Cited

U.S. PATENT DOCUMENTS

| | | | |
|---|---|---|---|
| 3,666,527 A | | 5/1972 | Feldstein et al. |
| 5,641,658 A | | 6/1997 | Adams et al. |
| 5,772,905 A | | 6/1998 | Chou |
| 5,795,782 A | | 8/1998 | Church et al. |
| 6,004,752 A | * | 12/1999 | Loewy et al. ........... 435/6.19 |
| 6,023,540 A | | 2/2000 | Walt et al. |
| 6,060,288 A | | 5/2000 | Adams et al. |
| 6,090,592 A | | 7/2000 | Adams et al. |
| 6,266,459 B1 | | 7/2001 | Walt et al. |
| 6,327,410 B1 | | 12/2001 | Walt et al. |
| 6,355,431 B1 | | 3/2002 | Chee et al. |
| 6,413,792 B1 | | 7/2002 | Sauer et al. |
| 6,428,959 B1 | | 8/2002 | Deamer |
| 6,485,944 B1 | | 11/2002 | Church et al. |
| 6,627,067 B1 | | 9/2003 | Branton et al. |
| 6,746,594 B2 | | 6/2004 | Akeson et al. |
| 6,770,441 B2 | | 8/2004 | Dickinson et al. |
| 6,824,659 B2 | | 11/2004 | Bayley et al. |
| 6,859,570 B2 | | 2/2005 | Walt et al. |
| 6,900,881 B2 | | 5/2005 | Sreenivasan et al. |
| 6,916,665 B2 | | 7/2005 | Bayley et al. |
| 6,927,070 B1 | | 8/2005 | Bayley et al. |
| 6,929,762 B2 | | 8/2005 | Rubin |
| 6,936,194 B2 | | 8/2005 | Watts |
| 6,936,433 B2 | | 8/2005 | Akeson et al. |
| 6,942,968 B1 | | 9/2005 | Dickinson et al. |
| 6,949,638 B2 | | 9/2005 | Mittmann et al. |
| 6,980,282 B2 | | 12/2005 | Choi et al. |
| 6,986,989 B2 | | 1/2006 | Mirkin et al. |
| 7,039,639 B2 | | 5/2006 | Brezin et al. |
| 7,041,604 B2 | | 5/2006 | Miller et al. |
| 7,105,452 B2 | | 9/2006 | Sreenivasan |
| 7,115,400 B1 | | 10/2006 | Adessi et al. |
| 7,122,482 B2 | | 10/2006 | Xu et al. |
| 7,157,036 B2 | | 1/2007 | Choi et al. |
| 7,179,396 B2 | | 2/2007 | Sreenivasan |

(Continued)

FOREIGN PATENT DOCUMENTS

EP   1 364 702   11/2003
EP   1 630 237   3/2006

(Continued)

OTHER PUBLICATIONS

Adessi et al., "Solid Phase DNA amplification: characterisation of primer attachment and amplification mechanisms", Nucleic Acids Research 28, 2000, 1-8.

Baner, "Signal amplification of padlock probes by rolling circle replication", Nucleic Acids Research, vol. 26(22), 1998, 5073-5078.

Bloomfield, "DNA condensation", Curr. Opin. Struct. Biol., vol. 6, 1996, 334-341.

Furuqi et al., "High-throughput genotyping of single nucleotide polymorphisms with rolling circle amplification", BMC Genomics, vol. 2, 2001, 4.

Guo, "Nanoimprint Lithography: Methods and Material Requirements", Advanced Materials 19, 2007, 495-513.

Heng et al., "Beyond the Gene Chip", Bell Labs Technical Journal, 10(3), ISSN: 1089-7089, 2005, 5-22.

(Continued)

*Primary Examiner* — Aaron Priest

(57) ABSTRACT

A method of fabricating a microarray including the steps of: (a) contacting a substrate having wells with a reagent reactive with said substrate to produce a surface modification within said wells and a surface modification surrounding said wells; (b) polishing said substrate to produce a polished surface modification surrounding said wells, wherein said surface modification surrounding said wells is removed and said surface modification within said wells is retained, and (c) depositing a biopolymer onto said substrate, wherein different affinities of said surface modification within said wells and said polished surface facilitate localization of said biopolymer within said wells.

15 Claims, 1 Drawing Sheet

(56) References Cited

U.S. PATENT DOCUMENTS

| | | |
|---|---|---|
| 7,186,656 B2 | 3/2007 | Sreenivasan |
| 7,205,244 B2 | 4/2007 | Stacey et al. |
| 7,211,214 B2 | 5/2007 | Chou |
| 7,256,131 B2 | 8/2007 | LaBrake |
| 7,279,113 B2 | 10/2007 | Watts et al. |
| 7,338,275 B2 | 3/2008 | Choi et al. |
| 7,444,053 B2 | 10/2008 | Schmidt et al. |
| 7,846,738 B2 | 12/2010 | Golovchenko et al. |
| 7,867,716 B2 | 1/2011 | Kang et al. |
| 7,947,454 B2 | 5/2011 | Akeson et al. |
| 7,972,858 B2 | 7/2011 | Meller et al. |
| 2001/0039072 A1* | 11/2001 | Nagasawa ............ G01N 33/552 438/106 |
| 2002/0012930 A1 | 1/2002 | Rothberg et al. |
| 2002/0055100 A1 | 5/2002 | Kawashima et al. |
| 2002/0061532 A1 | 5/2002 | Adams et al. |
| 2002/0120127 A1* | 8/2002 | Church et al. ............... 536/25.3 |
| 2003/0148401 A1* | 8/2003 | Agrawal et al. ............... 435/7.9 |
| 2004/0002090 A1 | 1/2004 | Mayer et al. |
| 2004/0029303 A1* | 2/2004 | Hart .................... B01L 3/5085 438/16 |
| 2004/0096853 A1 | 5/2004 | Mayer |
| 2006/0014001 A1 | 1/2006 | Zhang et al. |
| 2007/0099208 A1 | 5/2007 | Drmanac et al. |
| 2008/0009420 A1 | 1/2008 | Schroth et al. |
| 2008/0014631 A1* | 1/2008 | Muraguchi et al. ....... 435/288.7 |
| 2010/0009872 A1 | 1/2010 | Eid et al. |

FOREIGN PATENT DOCUMENTS

| | | |
|---|---|---|
| WO | WO 97/07429 | 2/1997 |
| WO | WO 2005/078130 | 8/2005 |
| WO | WO 2005/112565 | 12/2005 |
| WO | WO 2007/010254 | 1/2007 |
| WO | WO 2008/155585 | 12/2008 |

OTHER PUBLICATIONS

Michael, "Randomly Ordered Addressable High-Density Optical Sensor Arrays", Analytical Chemistry, vol. 70(7), 1998, 1242-1248.
Pease and Chou, "Lithography and Other Patterning Techniques for Future Electronics", Proceedings of the IEEE, vol. 96, No. 2, 2008, 248-270.
Shendure et al., "Advanced sequencing technologies: methods and goals", Nature Rev. Genet., 5, 2004, 335-344.

* cited by examiner

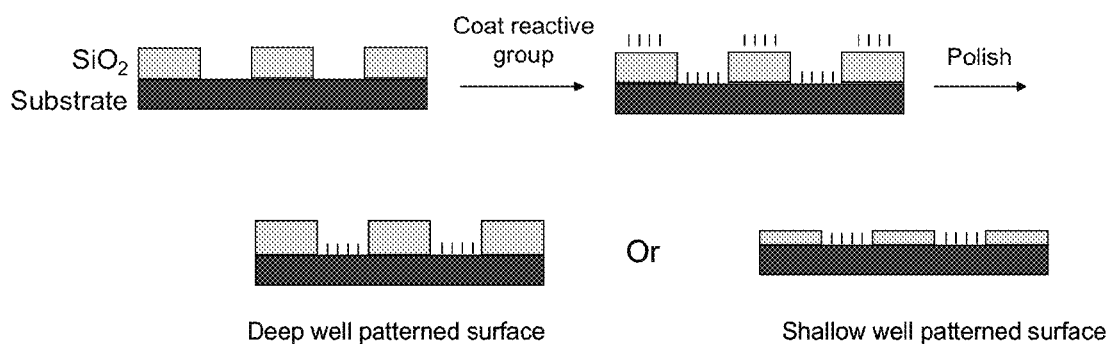
Surface pattern fabrication using polish method
Deep well patterned surface          Shallow well patterned surface

MICROFABRICATION METHODS FOR THE OPTIMAL PATTERNING OF SUBSTRATES

This application is a divisional of U.S. application Ser. No. 12/665,652, having a §371 (c)(1), (2), (4) date of Jan. 14, 2011, now pending, which is a national phase application of PCT/US08/67402, filed Jun. 18, 2008, now expired, which claims the benefit of U.S. Provisional application Ser. No. 60/936,287, filed Jun. 18, 2007, the entire disclosures all of which are incorporated herein by reference.

BACKGROUND OF THE INVENTION

The present invention relates generally to genomics analysis, and more specifically to methods for producing arrays for high throughput genomics analysis.

The task of cataloguing human genetic variation and correlating this variation with susceptibility to disease is daunting and expensive. A single genome sequence has a price tag of approximately $10-20 million using traditional methods. A drastic reduction in this cost is imperative for advancing the understanding of health and disease. The near term goal in genomics analysis is to resequence the human genome at a cost 3-4 orders of magnitude less, or about $100,000 dollars. The ultimate goal is to reduce this cost to $1000 dollars per genome. A reduction in sequencing costs to less than $100,000 per genome will require a number of technical advances in the field. Fortunately, the same basic principles of readout parallelization and sample multiplexing that proved so powerful for gene expression and SNP genotyping analysis are also being successfully applied to large-scale sequencing. Technical advances that stand to facilitate the $100,000 genome analysis, or less, include: (1) library generation; (2) highly-parallel clonal amplification and analysis; (3) development of robust cycle sequencing biochemistry; (4) development of ultrafast imaging technology; and (5) development of algorithms for sequence assembly from short reads.

The ability to specify the content of the DNA library in a targeted manner is extremely useful for a number of applications. In particular, the ability to resequence all exons in the cancer genome would greatly facilitate the discovery of new cancer genes. The comprehensive resequencing of cancer genomes is a major objective of the Cancer Genome Atlas Project (cancergenome.nih.gov/index.asp) and would greatly benefit from a reduction in sequencing price. Given the near term objective of the $100,000 genome, it should be feasible to resequence all approximately 250,000 exons in the genome for about $1000 per sample. A good method for creating a targeted library of the 250,000 exons from the genome is important. The approach of single-plex PCR for each exon is clearly cost prohibitive. As such, parallelization of the sample preparation is of paramount importance in reducing sequencing costs.

In addition to library generation, the creation of clonal amplifications in a highly-parallel manner is also essential to cost-effective sequencing. Sequencing is generally performed on clonal populations of DNA molecules traditionally prepared from plasmids grown from picking individual bacterial colonies. In the human genome project, each clone was individually picked, grown-up, and the DNA extracted or amplified out of the clone. In recent years, there have been a number of innovations to enable highly-parallelized analysis of DNA clones particularly using array-based approaches. In the simplest approach, the library can be analyzed at the single molecule level which by its very nature is clonal. Generally, DNA molecules are captured on a solid phase surface such that individual species are spatially separated from each other and distinguishable in subsequent cycles of sequencing. Current capture methods are random in nature and rely, at least in part, on precise control of conditions to allow an optimal density of DNA molecules to attach to the surface. Improper conditions can lead to overcrowding such that individual species are not distinguishable or, alternatively, high vacancy rates that can reduce the information gained per run to a level that wastes expensive sequencing reagents.

Thus, there exists a need to develop methods to improve nucleic acid capture for genomics analysis and provide more cost effective methods for sequence analysis. The present invention satisfies this need and provides related advantages as well.

SUMMARY OF THE INVENTION

The invention is directed to a method of fabricating a microarray. The method includes: (a) providing a substrate having at least two layers of different chemical reactivity, wherein a well in an outer layer exposes an inner layer; (b) contacting the substrate with a first reagent specifically reactive with the outer layer to produce a first modified layer; (c) contacting the substrate with a second reagent specifically reactive with the inner layer of the substrate to produce a modified inner layer, wherein the modified inner layer has a higher affinity for a biopolymer than the modified outer layer, and (d) depositing the biopolymer onto the modified inner layer within the well, wherein the higher affinity of the modified inner layer facilitates localization of the biopolymer onto the well. Methods of fabricating a microarray which include polishing a substrate or functionalizing a plurality of features with a reactive reagent also are provided. A method of fabricating a microarray which includes loading a plurality of discrete nanochannels is additionally provided.

BRIEF DESCRIPTION OF THE DRAWINGS

FIG. 1 is a schematic diagram showing one embodiment of a polishing method for surface pattern microfabrication of substrate features having different biopolymer affinities compared to the surrounding substrate.

DETAILED DESCRIPTION OF THE INVENTION

This invention is directed to methods for producing optimal substrates for analysis of populations of molecules such as nucleic acids. The substrates of the invention increase the parallelization of current substrates allowing for increased efficiency in multiplexing and the simultaneous analysis of a large number of different species of molecules. The methods employ substrate treatments or procedures that allow for the placement of molecular species at defined sites. Thus, the substrate is ordered with respect to the positions of sites available for attachment of nucleic acids or other desired molecules. Molecules can be contacted with the substrate under conditions that allow individual molecular species to populate the attachment sites in a predetermined or random manner. As such, there are at least two types of order for a substrate described herein, the first relating to the spacing and relative location of attachment sites and the second relating to predetermined knowledge of the particular species of molecule that attaches at a particular site. For example, a substrate can be contacted with a population of nucleic acids under conditions where the nucleic acids attach at sites that are ordered with respect to their relative locations but random with respect to knowledge of the sequence for the nucleic acid species present at any particular site. A particularly useful characteristic of controlled placement of single molecular species is that it allows for optimal packing of substrates with target probes or samples while minimizing overlap of different molecular species.

In one specific embodiment, the invention utilizes differential treatments of substrate features and surrounding areas to promote the deposition of single molecular species at each feature site. The features include planar surfaces or surfaces having different physical shapes such as substrate wells or raised features. The treatment in the center of the feature is selected to promote deposition of target molecules whereas the treatment surrounding the center, such as the sides of wells, substantially precludes deposition of target molecules. The differential chemical and/or physical treatments include chemical modifications of the surface to produce different affinities for target molecules at the feature compared to the surrounding area. In another specific embodiment, the invention utilizes nanomaterials to efficiently produce controlled patterns having single molecular species at defined placements.

As used herein, the term "substrate" is intended to mean a solid support. The term includes any material that can serve as a solid or semi-solid foundation for creation of features such as wells for the deposition of biopolymers, including nucleic acids, polypeptide and/or other polymers. A substrate of the invention is modified, for example, or can be modified to accommodate attachment of biopolymers by a variety of methods well known to those skilled in the art. Exemplary types of substrate materials include glass, modified glass, functionalized glass, inorganic glasses, microspheres, including inert and/or magnetic particles, plastics, polysaccharides, nylon, nitrocellulose, ceramics, resins, silica, silica-based materials, carbon, metals, an optical fiber or optical fiber bundles, a variety of polymers other than those exemplified above and multiwell microtier plates. Specific types of exemplary plastics include acrylics, polystyrene, copolymers of styrene and other materials, polypropylene, polyethylene, polybutylene, polyurethanes and Teflon™. Specific types of exemplary silica-based materials include silicon and various forms of modified silicon.

Those skilled in the art will know or understand that the composition and geometry of a substrate of the invention can vary depending on the intended use and preferences of the user. Therefore, although planar substrates such as slides, chips or wafers are exemplified herein in reference to microarrays for illustration, given the teachings and guidance provided herein, those skilled in the art will understand that a wide variety of other substrates exemplified herein or well known in the art also can be used in the methods and/or compositions of the invention.

As used herein, the term "feature" is intended to mean a discrete physical element or discrete physical trait of a substrate. A feature includes a location, position or site occupied, or available for occupancy on a substrate, or a distinguishable physical, structural or chemical trait of substrate. Therefore, a feature is a component of a substrate that provides physical or functional separability.

A feature separates a biopolymer deposited at a first feature from a biopolymer deposited at a second feature. Examples of features include spots contained on a slide, chip or other planar substrate, a patterned substrate and separable chemical moieties or reactive groups.

A patterned substrate can include, for example, wells etched into a slide or chip. The pattern of the etchings and geometry of the wells can take on a variety of different shapes and sizes so long as such features are physically or functionally separable from each other. Particularly useful substrates having such structural features are patterned substrates that can select the size of solid support particles such as microspheres. An exemplary patterned substrate having these characteristics is the etched substrate used in connection with BeadArray technology (Illumina, Inc., San Diego, Calif.). Further examples, are described in U.S. Pat. No. 6,770,441, which is incorporated herein by reference.

As used herein, the term "nanochannel" is intended to mean a cylindrical structure having an inner diameter measured on a nanometer (nm) scale. Exemplary internal diameters applicable to the methods of the invention include, for example, ranges between about 0.5-500 nm. Useful internal diameters include, for example, ranges between 1.0-100 nm. Particularly, useful internal diameters for the methods of fabricating a microarray of the invention include, for example, ranges between about 5.0-20 nm. Internal diameters of about 10 nm are exemplified herein with reference to nucleic acid biopolymers. In particular embodiments, nanochannels have a diameter that accommodates no more than a single biopolymer of a particular type such as a single stranded nucleic acid or double stranded nucleic acid. Nanochannels can be composed of a wide variety of materials well known in the art of material science and include, for example, silica, plastic, glass, metals, cladding of a fiber optic and/or polymers.

As used herein, the term "affinity" or a grammatical equivalent thereof, is intended to mean the attractive force exerted between substances that causes them to enter into and/or remain in combination. Therefore, when used in reference to the attraction of a modified substrate layer to a biopolymer the term is intended to refer to the strength at which a modified substrate layer and a biopolymer associate. The measure of the strength of association can be, for example, qualitative, relative, or quantitative. The type of association can include, for example, non-covalent interactions, covalent interactions. Specific examples of non-covalent interactions include electrostatic forces, hydrogen bonding and/or van der waal's forces. A specific example of a covalent interaction includes chemical bond formation.

As used herein, the term "functionalize" or a grammatical equivalent thereof, when used in reference to a substrate or feature thereof is intended to mean a modification that changes a chemical property of the referenced substrate or feature. Modifications can include, for example, chemical and/or physical alterations that confer a desired property, performance or activity. Predetermined properties include, for example, chemical or reactive specificity that confers a new activity onto the referenced substrate or feature. Specific examples of chemical modifications that can be used to functionalize a substrate or feature to change the chemical or reactive specificity include reacting silicon dioxide with trichloro alkyl silane or trichlorosilane derivatized with a moiety other than alkyl such as a hydrophilic moiety or a moiety that is reactive with nucleic acids or other biopolymer. Further examples include, but are not limited to, reacting a substrate with ammonia gas to create diaminotriazine, reacting amorphous silicon with Grignard reagents to substitute surface hydrogens with organic groups such as a hydrophilic moiety or a moiety that is reactive with nucleic acids or other biopolymer (see Ehara et al., *Chemistry Letters* 30:616 (2001). Self assembly of thiols on a gold surface can be used for surface patterning including, for example, use of 6-(Ferrocenyl)hexanethiol for self-assembly on a gold surface. Other modifications to substrates or features thereof well known in the art such as chemical vapor deposition or atomic layer deposition methods used for semiconductor and thin film research can also be used and are included within the meaning of the term as it is used herein.

As used herein, the term "polishing" is intended to mean mechanical or chemical treatment of a substrate, or a portion thereof, to remove a part of the substrate. Therefore, the term includes removing a coat of a substrate, including a coat of a layer of a substrate. Removal can be uniform or non-uniform. The term includes, for example, rubbing, chafing, smoothing, or otherwise treating a surface by the motion of applied pressure or other frictional forces as well as developing, finishing or refining the substrate to produce an altered surface of the substrate. The resultant surface is referred to herein as a "polished" surface. A direct polishing method can be used such that an abrasive surface contacts the surface to be polished or indirect polishing can be used such that a slurry or suspended aggregate is contacted with the surface in a lapping process. Specific examples of mechanical polishing include sanding, grinding or lapping. Chemical polishing methods can also be used such as treatment with acids such as hydrofluoric acid or bases such as sodium hydroxide. Other methods well know in the art that can remove a part of a substrate, including a part of a layer of a substrate, also are included within the meaning of the term as it is used herein. One exemplary polishing method for removing part of a substrate, and reactive groups thereon, to yield either a deep or shallow well patterned substrate is illustrated in FIG. 1. In particular embodiments, polishing can exclude mechanical and chemical methods of removing a photoresist.

As used herein, the term "microsphere," "bead" or "particle" is intended to mean a small discrete particle as a solid support of the invention. Populations of microspheres can be used for attachment of populations of biopolymers such as nucleic acid probes, other nucleic acids, polypeptides, ligands, and the like. The composition of a microsphere can vary, depending on, for example, the format, chemistry and/or method of attachment and/or on the method of biopolymer synthesis, including nucleic acid synthesis. Exemplary microsphere compositions include solid supports, and chemical functionalities imparted thereto, used in polynucleotide, polypeptide and/or organic moiety synthesis. Such compositions include, for example, plastics, ceramics, glass, polystyrene, methylstyrene, acrylic polymers, paramagnetic materials, thoria sol, carbon graphite, titanium dioxide, latex or cross-linked dextrans such as Sepharose, cellulose, nylon, cross-linked micelles and Teflon™, as well as any other materials that can be found described in, for example, "*Microsphere Detection Guide*" from Bangs Laboratories, Fishers Ind.

The geometry of a microsphere also can correspond to a wide variety of different forms and shapes. For example, microspheres used as solid supports of the invention can be spherical, cylindrical or any other geometrical shape and/or irregularly shaped particles. In addition, microspheres can be, for example, porous, thus increasing the surface area of the microsphere available for probe or other nucleic acid attachment. Exemplary sizes for microspheres used as solid supports in the methods and compositions of the invention can range from nanometers to millimeters or from about 10 nm-1 mm. Particularly useful sizes include microspheres from about 0.2 µm to about 200 µm, with from about 0.5 µm to about 5 µm being particularly useful.

As used herein, the term "biopolymer" is intended to mean a polymer corresponding to a chemical compound or composite of chemical compounds formed by polymerization of monomeric subunits in a biological system. Biopolymers include high or low molecular weight polymer such as a macromolecule consisting of a few or of many repeating monomers of relatively low molecular weight. Particular classes of biopolymers include, for example, nucleic acids, polypeptides, polysaccharides and lipids. Monomers of macromolecules include, for example, nucleotides as the repeating building blocks or subunits of nucleic acids, amino acids for polypeptides, and carbohydrates for polysaccharide. Biopolymers can be composed of naturally occurring monomers as well as non-naturally occurring monomers including, for example, analogs, derivatives and mimetics thereof. Accordingly, specific biopolymers can be formed biosynthetically or by chemical synthesis. Polymers formed by biosynthesis well known in the art other than those exemplified above also are included within the definition of the term as it is used herein. The invention is exemplified by specific reference to nucleic acid biopolymers. However, those skilled in the art will understand that the methods and processes of the invention are equally applicable for producing microarrays having optimal characteristics to any type of biopolymer well known in the art.

As used herein, the term "nucleic acid" is intended to mean a ribonucleic or deoxyribonucleic acid or analog thereof, including a nucleic acid analyte presented in any context; for example, a probe, target or primer. Particular forms of nucleic acids of the invention include all types of nucleic acids found in an organism as well as synthetic nucleic acids such as polynucleotides produced by chemical synthesis. Particular examples of nucleic acids that are applicable for analysis through incorporation into microarrays produced by methods of the invention include genomic DNA (gDNA), expressed sequence tags (ESTs), DNA copied messenger RNA (cDNA), RNA copied messenger RNA (cRNA), mitochondrial DNA or genome, RNA, messenger RNA (mRNA) and/or other populations of RNA. Fragments and/or portions of these exemplary nucleic acids also are included within the meaning of the term as it is used herein.

The compositions and methods set forth herein are equally useful for analysis of large genome nucleic acid analytes, such as those typically found in eukaryotic unicellular and multicellular organisms, shorter nucleic acids such as cDNA as well as for synthetic polynucleotides. Exemplary eukaryotic nucleic acids that can be used in a method of the invention include, without limitation, nucleic acids obtained from a mammal such as a rodent, mouse, rat, rabbit, guinea pig, ungulate, horse, sheep, pig, goat, cow, cat, dog, primate, human or non-human primate; a plant such as *Arabidopsis thaliana*, corn, sorghum, oat, wheat, rice, canola, or soybean; an algae such as *Chlamydomonas reinhardtii*; a nematode such as *Caenorhabditis elegans*; an insect such as *Drosophila melanogaster*, mosquito, fruit fly, honey bee or spider; a fish such as zebrafish; a reptile; an amphibian such as a frog or *Xenopus laevis*; a *dictyostelium discoideum*; a fungi such as *pneumocystis carinii, Takifugu rubripes*, yeast, *Saccharamoyces cerevisiae* or *Schizosaccharomyces pombe*; or a *plasmodium falciparum*. The methods of the invention also can be used with nucleic acids from organisms having smaller genomes such as those from a prokaryote such as a bacterium, *Escherichia coli*, staphylococci or *mycoplasma pneumoniae*; an archae; a virus such as Hepatitis C virus or human immunodeficiency virus; or a viroid.

A nucleic acid can be isolated from one or more cells, bodily fluids or tissues. Methods well known in the art can be used to obtain a bodily fluid such as blood, sweat, tears, lymph, urine, saliva, semen, cerebrospinal fluid, feces or amniotic fluid. Similarly known biopsy methods can be used to obtain cells or tissues such as buccal swab, mouthwash, surgical removal, biopsy aspiration or the like. Nucleic acids also can be obtained from one or more cell or tissue in primary culture, in a propagated cell line, a fixed archival sample, forensic sample, fresh frozen paraffin embedded sample or archeological sample.

Exemplary cell types from which nucleic acids can be obtained include, without limitation, a blood cell such as a B lymphocyte, T lymphocyte, leukocyte, erythrocyte, macrophage, or neutrophil; a muscle cell such as a skeletal cell, smooth muscle cell or cardiac muscle cell; germ cell such as a sperm or egg; epithelial cell; connective tissue cell such as an adipocyte, fibroblast or osteoblast; neuron; astrocyte; stromal cell; kidney cell; pancreatic cell; liver cell; or keratinocyte. A cell from which gDNA is obtained can be at a particular developmental level including, for example, a hematopoietic stem cell or a cell that arises from a hematopoietic stem cell such as a red blood cell, B lymphocyte, T lymphocyte, natural killer cell, neutrophil, basophil, eosinophil, monocyte, macrophage, or platelet. Other cells include a bone marrow stromal cell (mesenchymal stem cell) or a cell that develops therefrom such as a bone cell (osteocyte), cartilage cells (chondrocyte), fat cell (adipocyte), or other kinds of connective tissue cells such as one found in tendons; neural stem cell or a cell it gives rise to including, for example, a nerve cells (neuron), astrocyte or oligodendrocyte; epithelial stem cell or a cell that arises from an epithelial stem cell such as an absorptive cell, goblet cell, Paneth cell, or enteroendocrine cell; skin stem cell; epidermal stem cell; or follicular stem cell. Generally any type of stem cell can be used including, without limitation, an embryonic stem cell, adult stem cell, or pluripotent stem cell.

Methods for synthesizing polynucleotides are well known in the art. Such methods can be found described in, for example, *Oligonucleotide Synthesis: A Practical Approach*, Gate, ed., IRL Press, Oxford (1984); Weiler et al., *Anal. Biochem.* 243:218 (1996); Maskos et al., *Nucleic Acids Res.* 20(7):1679 (1992); Atkinson et al., *Solid Phase Synthesis of Oligodeoxyribonucleotides by the Phosphitetriester Method*, in *Oligonucleotide Synthesis* 35 (M. J. Gait ed., 1984); Blackburn and Gait (eds.), *Nucleic Acids in Chemistry and Biology*, Second Edition, New York: Oxford University Press (1996), and in Ansubel et al., *Current Protocols in Molecular Biology*, John Wiley and Sons, Baltimore, Md. (1999).

As used herein, the term "species" when used in reference to a biopolymer is intended to mean one or more biopolymer molecules having substantially the same monomer sequence. Therefore, a biopolymer species includes a single biopolymer molecule or a population of biopolymer molecules where all molecules within the population have substantially the same primary sequence. The term also is intended to refer to a biopolymer having concatenated copies of substantially the same nucleotide sequence.

Biopolymer species or single molecules, for example, can be attached to a substrate of the invention using any of the methods exemplified herein as well as a variety of other methods well known in the art. Such methods include for example, attachment by direct chemical synthesis onto the solid support, chemical attachment, photochemical attachment, thermal attachment, enzymatic attachment, enzymatic synthesis and/or absorption. These and other methods are will known in the art and are applicable for attachment of biopolymers, including nucleic acids, in any of a variety of formats and configurations. The resulting biopolymer species or molecules can be attached to a substrate via a covalent linkage or via non-covalent interactions as exemplified herein or through other methods well known in the art.

As used herein, the terms "nucleic acid clonal ball," "nucleic acid ball" or "DNA ball" are intended to mean a concatemer of a nucleic acid sequence collapsed into a random coil configuration. Therefore, a nucleic acid ball refers to multiple copies of a DNA or RNA sequence linked end to end in a tandem series that assumes a compacted configuration relative to its linear or other extended configuration. Nucleic acid balls and methods of preparing them are well known in the art and can utilize, for example, enzymatic amplification reactions of a wide variety of nucleic acid sources to produce concatenated repeats of the amplification template. One particularly useful amplification reaction is rolling circle amplification (RCA), which is used to amplify a circular nucleic acid template. Such methods can be found described in, for example, Shendure et al., *Nature Rev.* 5:335-344 (2004); Baner et al., *Nucl. Acids Res.* 26:5073-5078 (1998); Furuqi et al., *BMC Genomics* 2:4 (2001); U.S. Patent application Ser. No. 60/878,792, and in U.S. Pat. No. 6,355,431, each of which is incorporated herein by reference. The product of amplification is a single concatemer having multiple copies of circle sequence complements. This concatemer will collapse into a random coil configuration or other more condensed structure to form a nucleic acid ball when placed in, for example, a high salt buffer. It will be understood that these "balls" need not be perfectly spherical and can include other globular or packed conformations. One particular form of a nucleic acid ball useful in the methods of the invention is a ball having a desired or predetermined dimension. The number of amplified template copies can be modulated to obtain a desired size or to generate, for example, a sufficient number of copies for efficient subsequent analysis such as for sequencing, for example.

The number of template copies or amplicons that can be produced can be modulated by appropriate modification of the amplification reaction including, for example, varying the number of amplification cycles run, using polymerases of varying processivity in the amplification reaction and/or varying the length of time that the amplification reaction is run, as well as modification of other conditions known in the art to influence amplification yield. Generally, the number of copies of a nucleic acid template is at least 1, 10, 100, 200, 500, 1000, 2000, 3000, 4000, 5000, 6000, 7000, 8000, 9000 and 10,000 copies, and can be varied depending on the particular application.

Methods for generating circular templates from linear or other non-circular template nucleic acids for RCA amplification, for example are will known in the art. One exemplary method is to enzymatically circularize a template nucleic acid molecule using, for example, a ligase. Exemplary ligases include a single stranded DNA ligase, such as CircLigase™ (Epicentre), a double stranded DNA ligase and an RNA ligase, which can be selected based on the type of nucleic acid molecule to be circularized, for example, single or double stranded DNA or RNA. A splint ligation reaction in which a splint acts as a template to hybridize two ends of a sample nucleic acid such that the ends are juxtaposed for ligation to circularize the sample nucleic acid molecule can also be used.

Amplicons can be compacted prior to deposition on a substrate of the invention, such as an array. Methods of compacting amplicons are known in the art (for example, as described by Bloomfield, *Curr Opin Struct Biol* 6(3): 334-41 (1996)) and exemplified further herein. For example, an alcohol or polyamine such as spermine or spermidine can be used. A compacted nucleic acid will have a structure that is more densely packed than the structure of the nucleic acid in the absence of a compacting agent or compacting condition and the structure will typically resemble a ball or globule. The generation of such compacted nucleic acid balls is useful for distribution at discrete locations on an array, as discussed further below in more detail. Various methods can be used to generate balls of a desired size, for example, using various compacting techniques and/or varying the number of copies in an amplicon. Generally, the compacted amplicons have an average diameter or width ranging from about 0.1-5.0 µm, for example, about 0.1 µm, about 0.2 µm, 0.3 µm, about 0.4 µm, about 0.5 µm, about 0.6 µm, about 0.7 µm, about 0.8 µm, about 0.9 µm, about 1 µm, about 1.5 µm, about 2 µm, about 2.5 µm, about 3 µm, about 3.5 µm, about 4 µm, about 4.5 µm and about 5 µm or more. Those skilled in the art will understand that nucleic acid balls of the invention also include all sizes in between and outside of the above exemplary size range. Such nucleic acid balls can then be manipulated and analyzed using a number of technology formats, as exemplified further herein.

If desired, the amplicons compacted as nucleic acid balls can be opened after or during use in a method of the invention, including opened following deposition on a substrate in an array. As used herein, an amplicon or DNA ball that is "opened" is one that has been treated to allow access of reagents for subsequent reactions, such as by partial or complete de-compaction. For example, the methods of the invention can be particularly useful for parallel sequence analysis of multiple nucleic acid molecules distributed on an array. In this specific embodiment, the amplicons distributed on an array should be accessible to reagents such as primers, nucleotides, buffers and enzymes such as polymerases or ligases as used in a particular sequencing method, so that a sequencing reaction can be carried out. Thus, a compacted amplicon that is inaccessible or partially accessible due to being in the form of a DNA ball or other compacted structure can be rendered more accessible by "opening" the compacted amplicon. Methods for "opening" nucleic acid molecules are well known in the art and include, for example, removal of compacting agents. Such an "opening" of an amplicon is analogous to, although not limited to the same mechanism as, the melting of regions of chromatin for expression of a particular region of a chromosome. It is understood that such methods of "opening" a compacted nucleic acid molecule need not result in a detectably different size of the compacted amplicon, only that the amplicon be rendered more accessible to reagents for a subsequent reaction.

As used herein, the term "plurality" is intended to mean a population of two or more different members. Pluralities can range in size from small, medium, large, to very large. The size of a small plurality can range, for example, from a few members to tens of members. Medium sized pluralities can range, for example, from tens of members to about 100 members or hundreds of members. Large pluralities can range, for example, from about hundreds of members to about 1000 members, to thousands of members and up to tens of thousands of members. Very large pluralities can range, for example, from tens of thousands of members to about hundreds of thousands, a million, millions, tens of millions and up to or greater than hundreds of millions of members. Therefore, a plurality can range in size from two to well over one hundred million members, as well as all sizes, as measured by the number of members, in between and greater than the above exemplary ranges. An exemplary number of features within a microarray includes a plurality of about 500,000 or more discrete features within 1.28 cm$^2$. Exemplary nucleic acid pluralities include, for example, populations of about $1 \times 10^5$, $5 \times 10^5$ and $1 \times 10^6$ or more different nucleic acid species. Accordingly, the definition of the term is intended to include all integer values greater than two. An upper limit of a plurality of the invention can be set, for example, by the theoretical diversity of nucleotide sequences in a nucleic acid sample of the invention.

The term "each," when used in reference to individual members within a plurality, is intended to recognize one or more members in a population. Unless explicitly stated otherwise the term "each" when used in this context is not intended to require or necessarily recognize all of the members in a plurality. Thus, "each" is intended to be an open term.

In one specific embodiment a welled substrate is differentially treated such that the wells favor deposition of target biopolymers and the well sides and substrate surface are refractory to deposition. In this specific embodiment, the substrate includes a silicon BeadChip (Illumina, Inc., San Diego, Calif.) having a silicon layer covered by a silicon dioxide layer. In this embodiment, the silicon layer can be treated so as to produce sites for the ligation of the 3' end of the DNA target sequence and the SiO$_2$ layer can be treated so as to repel or resist attachment or binding of DNA. This provides for the top surface of the substrate as well as the side wall of the individual well cores to repel DNA attachment while the bottom of the well cores can attach to DNA molecules. A SiO$_2$ depth of about 0.5 to 1.0 µm is used to achieve a mean well diameter of about 1 µm. Such a substrate is uniquely suited for favorable deposition of amplicons such as nucleic acid balls to produce an array having a single biopolymer species at each feature of the substrate.

Accordingly, the invention provides a method of fabricating a microarray. The method includes: (a) providing a substrate having at least two layers of different chemical reactivity, wherein a well in a second layer exposes a first layer; (b) contacting the substrate with a first reagent specifically reactive with the first layer to produce a first modified layer; (c) contacting the substrate with a second reagent specifically reactive with the second layer of the substrate to produce a second modified layer, wherein the first and second modified layers have different affinities for a biopolymer, and (d) depositing the biopolymer onto the first modified layer within the well, wherein the different affinities of the first and second modified layers facilitate localization of the biopolymer onto the first modified layer.

In one aspect of the invention, the methods of fabricating a microarray generate a substrate feature having a higher affinity for a biopolymer than the substrate surface or area surrounding the feature. Deposition of biopolymer on substrates prepared according to this method of the invention inherently concentrates the biopolymer at each feature of the substrate due to differential attraction at the feature compared to its surrounding. Additional procedures also can be implemented to further facilitate localization of deposited biopolymers at each feature while maintaining the surrounding substrate devoid of biopolymer. Following the teachings and guidance provided herein, a variety of different substrates and modifying reagents can be employed to achieve a substrate having a differential affinity at one or more features for a biopolymer compared to the surrounding area. As described further below, the surrounding area of a substrate feature can be, for example, the perimeter of a feature, including the perimeter of a planar feature, a structural feature and/or the sides of a well or cylindrical feature. These surrounding areas can be maintained or modified to have, for example, hydrophobic characteristics and, therefore, a lower affinity for a biopolymer compared to substrate feature.

The methods of invention for fabricating a microarray can employ a wide variety of substrate types and/or substrate forms. Various different types of substrate materials have been exemplified previously. These and other materials well known in the art can be used in the methods of fabrication of the invention. For illustration purposes, various methods are described herein with reference to silicon or glass substrates. However, given the teachings and guidance provided herein, those skilled in the art will understand that the methods are equally applicable to other substrates having similar functional characteristics and a compatible chemistry for producing differential reactivities or, as with other embodiments of the invention, differential functionalization, albeit such other substrates can have a different structure and/or material makeup.

In this aspect of the invention, a substrate is provided for construction of a microarray having at least two layers of different chemical reactivity. In particular embodiments, the first layer has an affinity for the biopolymer type that is to be deposited onto the substrate. It is understood that reference to a first layer or to a second layer refers to different layers of the substrate and is not intended to connote a particular order or orientation of the referenced layers unless such order or orientation is explicitly described herein. Similarly, reference to a first layer or to a second layer also is not intended to connote a particular location or require a particular order for performance of a step in a method of the invention unless such location or order of performance is explicitly described herein. Therefore, reference to a first, second or other substrate layer is intended to distinguish one referenced layer from another referenced layer, or layers, with respect to the reference activity or any referenced relative orientation. The term "layer" as it is used herein is intended to have its plain and ordinary meaning, namely, a thickness of a substance lying over, under, surrounding or adjacent to another substance. The substances of two or more layers can be the same and the demarcation between layers empirical, or the substances of two or more layers can differ, thus producing an actual boundary between each layer.

The substrate can be, for example, silicon or other silica or silicates, glass, plastics, polysaccharides, nylon, nitrocellulose resins, carbon and metals or other solid support as exemplified previously and includes a first layer having a first chemical reactivity. As described below, a substrate of the invention having at least two layers of different chemical reactivity can be fabricated anew or obtained from sources well known in the art. In this aspect of microfabrication of the invention, the substrate should have at least two layers of different chemical reactivity or the substrate should be amenable to modification to exhibit at least two layers having different chemical reactivities. Therefore, substrates of the invention include solid supports employed in the art as microarrays.

For fabrication of a microarray, features of the selected substrate can be in the form of a well, an etched feature or other concave, conical or cylindrical feature in a substrate. Methods for preparing concave substrate features such as wells are well known in the art. One particularly useful method is acid etching a substrate to produce micrometer scale wells as described in, for example, Michael et al., *Anal. Chem.* 70:1242-48 (1998) and in U.S. Pat. Nos. 6,023,540, and 6,327,410. Other methods for creating wells in a substrate include, for example, a variety of other etching methods, imprinting, stamping, ablating, ion bombardment and the like such as described in, for example, U.S. Pat. Nos. 6,942,968; 6,770,441, and 3,666,527. Substrates available in the art having etched features or wells include, for example, the etched substrate used in connection with the fiber optic Sentrix array matrix and the BeadChip (both from Illumina, Inc., San Diego, Calif.), injection molded plastic surfaces or etched substrates made by methods available from Boehringer Ingelheim microParts GmbH (Dortmund, Germany).

Concave features such as etched wells can be constructed in a substrate to various desired sizes including, for example, well diameter, feature width, feature length and/or depth using methods well known in the art. Particularly useful sizes are wells having sufficient breadth and depth to hold a single microsphere of a certain size or a single nucleic acid ball of a certain size. Wells designed and constructed to hold single microspheres and/or nucleic acid balls allows for the placement of a single target biopolymer species at each feature of the microarray. The number of copies of each deposited biopolymer can be varied depending on the need of the user. Alternatively, wells also can be constructed to hold multiple microspheres and/or nucleic acid balls of particular dimensions.

Generally, concave features such as wells will have sizes ranging from, for example, about 0.05-20 µm in depth although wells depths larger that 20 µm can routinely be constructed using the methods exemplified above. Concave features such as wells having depths between, for example, 0.1-10 µm are particularly useful for depositing single microspheres or nucleic acid molecules. Accordingly, the depth of a feature or well on a substrate of the invention can include, for example, an average depth of, for example, about 0.1 µm, about 0.2 µm, 0.3 µm, about 0.4 µm, about 0.5 µm, about 0.6 µm, about 0.7 µm, about 0.8 µm, about 0.9 µm, about 1 µm, about 1.5 µm, about 2 µm, about 2.5 µm, about 3 µm, about 3.5 µm, about 4 µm, about 4.5 µm, about 5 µm, about 5.5 µm, about 6.0 µm, about 6.5 µm, about 7.0 µm, about 7.5 µm, about 8.0 µm, about 8.5 µm, about 9.0 µm, about 9.5 µm and 10.0 µm or more. Those skilled in the art will understand that well depths of the invention also include all sizes smaller, in between and greater than the above exemplary depths.

Well breadth such as diameter, width and/or length, depending on the shape of the feature, also generally will be within the above size ranges. Particularly useful well breadths for holding single microspheres or nucleic acid balls include diameters of, for example, about 0.1-10 µm as described above. As with the well depths exemplified above, the well breadth also can be altered depending on the need and particular application. For example, it may be desirable to use microspheres larger than the above exemplified depths and/or breadths. In general, microspheres can range from, for example, about 0.1 µm to about 1.0 mm although microspheres of about 0.2-200 µm can be more useful, with microspheres of about 0.5-5 µm being particularly useful. Given the teachings and guidance provided herein, those skilled in the art will understand that the depth, diameter, width and/or length of concave features such as wells can be generated to suit any size microsphere and/or nucleic acid. Similarly, those skilled in the art also will understand that the depth, diameter, width and/or length of a concave feature such as a well can be generated to have, for example, a microsphere and/or nucleic acid ball, completely within the well, partially protruding above the well rim or mostly protruding above the well rim.

In addition to the first layer and concave features of a substrate, in this particular embodiment a substrate also will contain at least a second layer. This second layer can form a coating on a first layer or can be an outer layer covering a first layer that is configured as an inner layer. In general, the second layer will consist of a substance having a different chemical reactivity compared to the first layer. Useful second layers are substances that have, or can be modified to have, a lower affinity for the biopolymer to be deposited onto the microarray compared to the first layer. Particularly useful second layers are substances that are refractory or repulsive to the deposited biopolymer. Methods for generating layers having different chemical reactivities and methods of differentially modifying one layer compared to other layers for creating different affinities for deposited biopolymers are described further below.

Wells are constructed or oriented in a substrate to penetrate through one layer so as to expose the other layer. For example, a substrate having at least two layers will have wells of sufficient depth or length to extend through the second layer into the first layer. Extension and exposure of the first layer unmasks and allows access to the different chemical reactivity of the first layer. It will be understood by those skilled in the art that the geometry and/or shape of the well in the second layer need not be identical to the geometry or shape of the well at its intersection or boundary with the first layer or at any portion of the well extending or terminating in the first layer. Similarly, the area of an exposed first layer need not be symmetrical and/or proportional to, for example, the circumference, diameter, shape, length or volume of the well penetrating the second layer. Rather, exposure is sufficient if there is sufficient surface area of the first layer to allow access of at least one chemical reactivity different from the second layer. In certain embodiments, efficiency in construction and increased stability of the resultant microarray can be enhanced by exposing a larger first layer surface area, up to proportions approximate in size to the circumference or surface area of the well at the first/second layer interface. Those skilled in the art will understand that smaller first layer exposures can be useful where single biopolymer molecules are to be deposited compared to larger first layer exposures where, for example, nucleic acid balls or biopolymer-containing microspheres are to be deposited.

In various embodiments, the orientation of the substrate wells is orthogonal to the at least first and second layers. However, such an orientation is not required to achieve modification of the first and second layers of the substrate to produce different affinity characteristics for a biopolymer. Rather, exposure of at least the different chemical reactivity of the first layer is well sufficient irrespective of orientation. Therefore, substrate wells can be any desired orientation with respect to the at least first and second layers so long as a biopolymer can be deposited in the well and contact the first layer following modification as described further below.

Substrates of the invention also can employ more than two layers resulting in multilayer microarrays. In such fabrications, some or all of the different layers can be used to produce a distinct chemical reactivity. Multiple layers of more than two are particularly useful because they impart flexibility in selection of the chemistry and type of biopolymer that can be applied to a microarray. More than two layers having different chemical reactivities also allow for the fabrication of a single general microarray that can be instantly tailored to accommodate a particular need without needing to design and fabricate new substrates having particular chemical reactivities. For example, a desired chemical reactivity can be generated in such general utility multilayered substrates by simply creating wells having a depth that will expose a layer having the desired chemical reactivity.

Therefore, in other embodiments of the invention, substrates having more than at least two layers of different chemical reactivity can be employed for the fabrication of microarrays. For example, microarrays can be constructed to contain 2, 3, 4 or 5 or more layers. The number of different chemical reactivities can range from at least two to the number of layers in the substrate or more. Achieving a number of different chemical reactivities greater than the number of substrates can be accomplished by, for example, partitioning one or more layers into two or more different chemical reactivities. For example, a first portion of a first layer can exhibit a first chemical reactivity and a second portion of the first layer can exhibit a second chemical reactivity due to selective treatment of one portion over another. Layering and apportioning different chemical reactivities can be used to achieve variety of different functionalities in one substrate. Any or all of the different functionalities can be selected for fabrication using the methods of the invention to yield a versatile microarray having a wide variety of different biopolymer applications.

Where more than two layers are utilized in a substrate of the invention, the actual depth or degree of intrusion into one or more different layers is determined by the user. Well depths can be differentially fabricated to intrude into different layers for alternative modifications on the same substrate. Accordingly, in this exemplary embodiment it is possible to construct a microarray exhibiting a variety of different affinities for one type of biopolymer or construct a microarray exhibiting a variety of different affinities each for a different type of biopolymer. A wide variety of formats for such a multifunctional microarray exist. For example, such substrates can be used to produce microarrays having the same type of biopolymer deposited at each well. Alternatively, a multifunctional substrate can be used to efficient construction of microarrays capable of attaching multiple, different types of biopolymers.

Methods for generating layers having different chemical reactivities and methods of differentially modifying one layer compared to other layers for creating different affinities for deposited biopolymers are applicable to the particular substrates of the invention as described herein. For example, in the specific embodiment of a two layer substrate, one layer can consist of silicon (Si) and the second layer can be silicon oxide ($SiO_2$). Each layer exhibits a different chemical reactivity which can be used to differentially modify the first layer compared to the second layer. Alternatively, a substrate having a single layer of the same chemical composition can be employed where a portion of the substrate is first modified to create at least a second layer. For example, a single silicon substrate can be employed where a portion such as the top, bottom, side or a subregion of one or more of these edges is modified to silicon dioxide. This preparatory modification thus produces a two layer substrate for use in a fabrication method of the invention. In like fashion, any of a variety of such preparatory procedures can be implemented to generate a substrate having the desired number of layers and/or different chemical reactivities.

The methods of the invention produce a microarray where at least one of the two layers is modified to facilitate deposition of a biopolymer at a feature. Various modification designs and chemistries can be implemented to achieve differential affinity of first and second layers of the substrate that will facilitate biopolymer deposition. The substrates having at least two layers allow for such implementation because a reagent having reactivity with one layer and not the other allows for such differential modifications. For example, a substrate which has low affinity for a selected biopolymer can be modified at a first layer, such as a layer found in a well or other feature, with moieties having higher affinities compared to a second layer surrounding the first layer. The different affinities will concentrate deposited biopolymers onto the modified first layer whether it be wells or another type of feature. In contrast, wells or other features on a substrate which exhibit a favorable affinity for the deposited biopolymer can be left unmodified at the first layer and a second layer, for example, one found at the periphery of the well or feature, can be modified with moieties having lower affinity for the biopolymer compared to the first layer. This latter single modification design also will result in two layers having different affinities that will preferentially localize biopolymers into the wells or other features at the first, unmodified layer.

In addition, a substrate having at least two layers of different chemical reactivity also can be modified at each layer to generate different affinities or to enhance different affinities at the first layer. In this specific embodiment, each layer will be modified and the resultant microarray will exhibit greater affinity for a selected biopolymer at the well or other feature at the first layer compared to the affinity for the selected biopolymer at the second feature. Other modification designs include, for example, starting with a single substrate composition and sequentially modifying one layer with a reagent to produce a reactive layer and modifying that reactive layer to generate a desired biopolymer affinity. The second layer can then be modified similarly or differently compared to the first layer to produce a second reactive layer. Subsequent modification to generate a second modified layer having an affinity different from the first modified layer can then be implemented to generate first and second layers that will facilitate deposition of a selected biopolymer into the well or other feature.

When performed sequentially as exemplified above, the second reagent and/or reactive layer can be the same or different compared to the first reagent and/or reactive layer. However, the final modified first and second layers will differ in affinity for a deposited biopolymer. A specific example where first and second reagents and/or reactive layers are the same is the conversion of layers of silicon to silicon dioxide on a substrate. In this embodiment, a first silicon layer can be converted to silicon dioxide under conditions where a second silicon layer is not converted. The silicon dioxide layer can then be modified to have a desired affinity for a biopolymer. The second silicon layer can subsequently be converted to silicon dioxide and further modified to a layer having a different biopolymer affinity than the first layer such as a reduced affinity or even repulsion of the biopolymer. Modifications also can be performed where the first layer is converted to the same or similar chemical specificity as the second layer on substrates having separable first and second layers that allow separate modifications of each layer. A specific example is the modification of a substrate having a first silicon layer and a second silicon dioxide layer. The first silicon layer can be converted to silicon dioxide layer and subsequently reacted with a first reagent specifically reactive, where the first layer is a well. Placing the first reagent in the well to modify the silicon dioxide layer leaves the second silicon dioxide layer unaffected. The second silicon dioxide layer can then be modified with a second reagent to produce a second modification.

With reference for purposes of illustration to the above two layer substrate corresponding to silicon and silicon dioxide, generation of first and second modified layers having different affinities for a biopolymer will be exemplified using trichloro alkyl silanes as a modifying reagent. Trichloro alkyl silane, or chlorosilane, is specifically reactive with silicon dioxide and can contain a wide variety of different chemical moieties to confer a different chemical characteristic onto the silicon dioxide layer; for example, reactivity with a biopolymer or other molecule, a hydrophobic characteristic or, alternatively, a hydrophilic characteristic. Conditions can be used in which silicon is inert or substantially unreactive to trichloro alkyl silane or chlorosilane. Thus, a layer of silicon is protected from modification by trichloro alkyl silane or chlorosilane. If desired, the silicon layer can first be converted to silicon dioxide and then specifically reacted with a trichloro alkyl silane having a chemical characteristic different from the first modified layer.

Modification of a welled substrate having at least two layers of different chemical reactivity to generate two modified layers having different affinity for a target biopolymer can be achieved by the utilization of inherent reactivity difference between silicon and silicon oxide. A layer of silicon dioxide will react with trichloro alkyl silanes to create a non-reactive hydrophobic surface which will naturally repel hydrophilic nucleic acids, polypeptides and other biopolymers. For example, a substrate can include an outer layer of silicon dioxide that surrounds a well that exposes an inner layer of the substrate. In this embodiment, the hydrophobic surface surrounding the well promotes localization of the target biopolymer into the welled inner layer having characteristics that attract or bind the biopolymer such as characteristics resulting from modification of the well as described below to contain hydrophilic characteristics.

For example, the remaining silicon surface, or untreated first layer inside the etched wells of the substrate, can be converted to silicon dioxide to produce a reactive layer. The reactive wells can then be treated with a second specifically reactive reagent containing moieties having hydrophilic characteristics or moieties specifically reactive with the target biopolymer. The second specifically reactive reagent also can be a trichloro alkyl silane albeit having chemical functional groups different from the trichloro alkyl silane reagent used to modify the second layer above which are attractive to the target biopolymer and/or reactive with the target biopolymer. In the former example, chlorosilane can have hydrophilic moieties which will promote localization of the target biopolymer at the well features due to non-covalent affinity interactions, particularly where the modified surface second layer exhibits a hydrophobic character. In the latter example, the chlorosilane can have, for example, any of a variety of chemical moieties that can covalently bond to the target biopolymer.

A variety of first and second reagents well known in the art can be employed with various first and second substrate layers having different chemical reactivities to produce first and second modified layers having different affinities for a biopolymer. The invention has been exemplified above with reference to a silicon or silicon/silicon dioxide two layer substrate and first and second trichloro alkyl silane reagents having different chemical moieties, respectively, however, other first and second layers having different chemical reactivities can include, for example, layers produced by sequential reactions of a substrate with chlorosilanes having different attached moieties, whereby differences in the moieties confer different properties to each layer. Given the teachings and guidance provided herein, those skilled in the art will understand that these and other substrate layers and compatible reagents specifically reactive thereto, such as those well known in the art, are equally applicable in the fabrication methods of the invention.

A variety of chemical moieties and functional groups can be employed with, for example, the above-exemplified substrate layers having various different chemical reactivities as well as others well known in the art to generate modified layers having the differential affinities for a target biopolymer as described herein. Examples of hydrophilic moieties that can be attached to or associated with trichloro alkyl silanes to confer, for example, non-covalent affinity interactions onto the modified first layer include, for example, positively charged moieties or negatively charged moieties. Examples of hydrophobic moieties that can be attached to or associated with trichloro alkyl silanes to confer, for example, repulsive affinity interactions onto the modified second layer include, for example, hydrocarbons or other noncharged moieties.

In addition to the above-exemplified moieties conferring non-covalent affinities onto a modified first or second layer, reactive moieties for covalent attachment of biopolymers also can be included or associated with a modifying reagents for creating the at least two modified layers having different affinities. Numerous reactive groups which are or can be associated with modifying reagents of the invention are well known in the art that have compatible chemistry for covalent bonding to a variety of biopolymers. Particularly useful reactive groups can be activated by, for example, light or other external stimulus such as exposure to gas or a liquid reagent for controlled linkage to the substrate at the first layer of a feature. Irradiation or other stimulation of the substrate after placing biopolymers including, for example, nucleic acid balls in the wells will immobilize the biopolymer on the bottom of the wells at the first modified layer of the substrate. Exemplary reactive groups include, for example, a reactive silane group, a reactive vinyl group, amino group, carboxylic acid, ester, thiol, aldehyde, hydrazine, carbodiimide, maleimide, photoreactive group or the like.

Biopolymers can be deposited into substrates generated as described above for the production of microarrays that are random or ordered with respect to the identity of the biopolymer(s) at each site. Multiple different species can be deposited at each feature or, alternatively, single biopolymer species can be deposited. Deposition of single species is particularly useful because it allows for enhanced performance in a wide variety of assays including, for example, sequencing by synthesis (SBS) of nucleic acids. Deposition of biopolymers will be exemplified further below with reference to multiple copies of a single nucleic acid species at each feature.

As described previously, deposition of single nucleic acid species can be accomplished by a variety of methods well known to those skilled in the art. Particularly useful approaches include, for example, deposition of microspheres having a single species of attached nucleic acid sequence or the deposition of nucleic acid balls. Placement of such complexes into the wells can be facilitated by, for example, moving the nucleic acid balls using alternating electrical charge applied at the ends of the substrate covered with a thin layer of aqueous solution to suspend the balls. A magnetic force can analogously be used when employing magnetic microspheres, for example.

Nucleic acid balls and microspheres are particularly useful vehicles for depositing single biopolymer species to a welled substrate feature because they can be readily generated using well known methods to create a physical structure of an individual target species that can be physically manipulated to form an ordered or random array. For example, rolling circle amplification (RCA) of a DNA sequence can be used to form a concatemer of length approximately 1000 times the length of the originating sequence, and consisting of approximately 1000 complimentary repeats of the originating sequence to form a molecular complex approximately 1 µm in diameter. Such complexes are referred to herein as "nucleic acid balls" and include, but are not limited to, those described in U.S. Ser. No. 60/878,792, which is incorporated herein by reference. Similarly, multiple copies of a target biopolymer species can be synthesized on, or chemically attached to a microsphere of a desired dimension. Any desired number of such complexes including, for example, tens of thousands of such complexes, can be prepared in parallel to each have a unique biopolymer species. Subsequent deposition onto a substrate of the invention will produce a microarray having a like number of biopolymer species, each located at a single feature, to produce a microarray of the invention. Because the biopolymer complexes will have approximately the same charge, they will repel each other and not clump together, instead assembling into the wells constructed to be of similar size.

With respect to microspheres, once deposited into the wells or, perhaps, deposited into the wells and covalently attached, they are directly usable in any of a variety of analysis methods. Nucleic acid balls similarly can be used directly in various analysis methods. However, in some embodiments it is beneficial to relax their compact structure and/or produce fragments containing a single copy of the repeated sequence of the concatamer in the nucleic acid balls (or the fragments can contain more than one copy of the repeated sequence but fewer copies than the number found in the unfragmented concatamer). Relaxing or fragmenting or both relaxing and fragmenting condensed repeated structures can allow greater access of, for example, reagents and enzymes for subsequent analysis.

For example, once nucleic acid balls are situated in wells, with one biopolymer species per well, an enzyme can be introduced to the microarray to cleave the balls into individual repeat strands of the target biopolymer sequence. In addition to allowing reagent access, this procedure will free 3' ends of the resultant nucleic acid fragments and allow a further means for covalent attachment to the bottom of the wells. The extent of fragmentation of the target sequences can be controlled by, for example, varying the temperature, time or reaction conditions of the digestion. Following attachment, free, unattached biopolymer can be removed by, for example, washing the microarray. Such immobilized nucleic acids on the microarray can be employed in a wide variety of nucleic acid analysis and detection procedures, including sequencing by synthesis.

In another specific embodiment, the invention is directed to a method for achieving optimal close packing of single biopolymer species such as DNA clones, DNA balls or microspheres. As with the previous exemplified method, substrates produced by this method also are particularly useful in high throughput parallel analysis such as DNA sequencing or digital gene expression. This specific embodiment employs microfabrication methods to pattern a surface with wells, specific biopolymer binding chemistry or both. In particular, chemical functional groups can be introduced to defined locations on a substrate surface, or in the interior of well features during the fabrication processes. Following microfabrication, the substrate is altered by chemical or mechanical polishing as illustrated in FIG. 1 to generate a non-reactive surface or a surface having lower affinity for the biopolymer compared to the affinity of the feature. Also as illustrated in FIG. 1, the amount of polishing can be metered to maintain, for example, deep well features or to achieve progressively shallower well features proportional to the amount of polishing. For example, polishing can be performed to produce a hydrophobic surface refractory to nucleic acids while the feature retains its original hydrophilic character.

Therefore, the invention provides a method of fabricating a microarray. The method includes: (a) contacting a substrate having wells with a reagent reactive with said substrate to produce a surface modification within said wells and a surface modification surrounding said wells; (b) polishing said substrate to produce a polished surface modification surrounding said wells, wherein said surface modification surrounding said wells is removed and said surface modification within said wells is retained, and (c) depositing a biopolymer onto said substrate, wherein different affinities of said surface modification within said wells and said polished surface facilitate localization of said biopolymer within said wells.

In this specific embodiment, polishing a surface of a substrate can be employed to produce a substrate having features exhibiting a different affinity for a biopolymer compared to the surrounding substrate surface or perimeter of the feature. Polishing is an efficient method to produce two different affinity layers in lieu of, or in addition to, differentially reacting layers having different chemical reactivities with modifying reagents as described previously.

In one embodiment, a substrate can be composed of a single material, without any initial layers. The substrate also can be created without the need to design at least two layers having different chemical reactivities. Rather, in this specific embodiment a single layer substrate can be modified throughout all surfaces, including well interiors (i.e., bottom and/or sides). Following modification the outermost surface of the substrate is polished to then remove the chemical modifications. This polishing results in return of the surface surrounding the well features to its original chemical reactivity while leaving the interior of the well features having reactive characteristics corresponding the chemical modifications.

The material of the unmodified substrate can exhibit, for example, a lower affinity or a neutral affinity toward the deposited biopolymer compared to the affinity of well surface areas following modification. By way of exemplification, the substrate can be silicon and the silicon can be converted to, for example, silicon dioxide. A reagent, such as trichloro alkyl silane having hydrophilic moieties or reactive groups for covalent attachment of biopolymers, can be reacted with the silicon dioxide to produce a modified substrate. The well bottom and sides as well as the surrounding surface will exhibit a hydrophilic character or have reactive groups toward the biopolymer. Alternatively, substrate having at least two layers can be used or produced as described previously. The first and second layers can have different chemical reactivities. Both layers can be reacted with a reagent to result in two modified layers having the same or different affinities for a deposited biopolymer.

Polishing the surrounding surface will remove such hydrophilic moieties or reactive attachment groups and result in the return of the surrounding surface to the original silicon. At least a portion of the well interiors will remain hydrophilic or have reactive groups for covalent attachment of biopolymers. For example, at least the bottom of the wells and a bottom portion of the sides of the wells will remain modified whereas the top portion of the well sides will be removed by polishing. Accordingly, in this specific embodiment of the invention, all surface areas of the substrate can be made to exhibit a favorable affinity toward the deposited biopolymer. Polishing at least a portion of the surface sufficient to remove the modification will result in a first layer, corresponding to the polished portion, and a second layer, corresponding to the concave features, having different affinity for the target biopolymer since they concave features were not polished. Similarly, where a two layer substrate is employed as exemplified above, polishing of a portion of either the first or second layer will result in removal of the modification of that layer with concomitant removal of the affinity for the biopolymer.

Accordingly, the invention further provides a method of fabricating a microarray where the polishing includes removing a first portion of a layer such that a second portion of the layer remains on the substrate. The second portion of the layer is exposed by the removing of the first portion of the layer. The substrate can include two or more layers. A first layer can be, for example, silicon and a second layer can be, for example, silicon oxide. The first layer can correspond to a lower layer which is the bottom of a well and the second layer can correspond to an upper layer which surrounds the wells and forms at least a portion of the sides of a well.

Polishing can be accomplished using a variety of physical or chemical methods well known in the art. One particularly useful method is to apply friction by mechanical motion. Typically, a brush or other device that contacts the surface of a substrate will have a contact area that is substantially larger than the width or diameter of wells in the substrate. Thus, the brush or contact device will be precluded from entering into the well, thereby leaving the bottom of the well unpolished. Various means can be employed to mechanically polish a substrate including, for example, rubbing, chafing, smoothing or other uses of frictional forces as exemplified above. Physical or mechanical methods well known in the art other than those exemplified above also can be employed in the methods of the invention for polishing a substrate so as to confer a different biopolymer affinity onto at least a portion of one layer of the substrate.

Chemical methods for polishing a substrate are equally applicable in the methods of the invention and include, for example, treatment with acids such as hydrofluoric acid or bases such as sodium hydroxide. Chemical methods well known in the art other than those exemplified above also can be employed in the methods of the invention for polishing a substrate so as to confer a different biopolymer affinity onto at least a portion of one layer of the substrate. Particular features, such as wells, can be masked from being polished when a chemical polishing method is used. Removal of the mask then allows those features that were protected from polishing to be subsequently available for modification such as modification to attach a biopolymer.

The initial substrate, well features and the like can be obtained or generated as described previously. Once prepared the substrate having at least one layer with a first polished portion and a second, unpolished modified portion can be used for depositing single species of biopolymers into each well feature. For example, deposition or deposition and covalent attachment of microspheres or nucleic acid balls as described previously are two exemplary means for generating a microarray having a single biopolymer species at each feature on a polished array.

In yet another specific embodiment, the invention is directed to methods for capturing individual molecules, to the exclusion of other molecules in the targeted vicinity, on the surface of a substrate. As with other methods and substrates of the invention, such single molecule capture is particularly useful for enhancing nucleic acid sequencing methods that benefit from the amplification of isolated molecules to build up localized populations in order to generate greater signal strength. In this specific embodiment, the methods of the invention allow for the capture of a single nucleic acid molecule or other biopolymer molecule within a total circular area having a diameter of about 0.1 μm and employs differential treatment of the center of the substrate feature compared to the area outside the circumference.

Additionally provided is a method of fabricating a microarray. The method includes: (a) functionalizing a plurality of features on a substrate to create discrete single biopolymer anchor sites, said functionalization comprising: (1) contacting said substrate with a reagent reactive with said substrate to produce a modified substrate; (2) applying a protecting reagent to discrete sites on said modified substrate, said discrete sites having an area of between about 5-40 $nm^2$; (3) modifying said reagent located in unprotected regions of said modified substrate surrounding said discrete sites, thereby rendering said regions unreactive to a target biopolymer, and (4) removing said protecting reagent to produce a substrate having a plurality of discrete functionalized features, and (b) attaching a single target biopolymer to one or more of said discrete functionalized features.

In this particular embodiment, microarray features utilize differential chemical functionalization to generate discrete features for attachment of a single nucleic acid molecule at each feature. Although well features can be used, in certain embodiments this variation of the methods of the invention is particularly useful with, for example, planar substrates because both the steps of well fabrication and microsphere or nucleic acid ball preparation can be omitted. The method includes functionalizing a plurality of discrete features on a substrate. The substrates and design of features can be those described previously.

Functionalization can be performed using any method well known in the art to create anchor sites for a target biopolymer. An anchor site refers to a substrate site that immobilizes a deposited biopolymer. Immobilization can occur through, for example, covalent or non-covalent interactions. Functionalization of discrete sites for covalent immobilization can be performed as described previously by, for example, modifying the surface of the substrate to contain desirable reactive groups. Functionalization of discrete sites for non-covalent immobilization can be performed by, for example, modifying the surface of the substrate to confer a chemical characteristic such as a hydrophilic characteristic or to localize agents that can be used to indirectly anchor the deposited biopolymer. A particular example of a covalent interaction includes those reactive functional groups described previously that form chemical bonds between the reactive group and the biopolymer. A particular example of a non-covalent interaction includes a ligand affinity interaction with its binding partner; for example, biotin and streptavidin or two complementary nucleic acid sequences. Various other non-covalent interactions are well known in the art and can be equally employed in the methods of the invention.

One useful method for functionalization of discrete sites includes contacting the substrate with a reagent specifically reactive with the substrate to produce a modified substrate as described previously. The functionalization can be across the entire surface of the substrate or areas covering the positions where the discrete sites are to be produced. In a particular embodiment, functionalization can occur by treating the entire substrate through submersion or exposure to the modifying reagent. Following modification, positions where discrete sites are to be fabricated are masked by applying a protecting reagent. Alternatively, discrete site positions can be chemically masked by, for example, chemical blocking groups activated by stimuli such as focused irradiation using a laser. The applied or chemical protecting reagent should cover an area of about 5-40 $nm^2$ since this range is particularly useful for anchoring single biopolymer molecules.

For example, an area covering about 5-40 $nm^2$ is sufficient to form a discrete feature for attachment of a single biopolymer molecule, being of such a size that, once a biopolymer is attached, the site is too small to allow attachment of another biopolymer molecule. Generally, a protected area will have a size ranging from, for example, the above range to as small as about 5-10 $nm^2$. Protected areas between, for example, 10-30 $nm^2$ are particularly useful for anchoring single biopolymer molecules at the exclusion of other molecules. Accordingly, the size of a protected feature on a substrate of the invention can include, for example, an average area of, for example, about 5 $nm^2$, 6 $nm^2$, 7 $nm^2$, 8 $nm^2$, 9 $nm^2$, 10 $nm^2$, 11 $nm^2$, 12 $nm^2$, 13 $nm^2$, 14 $nm^2$, 15 $nm^2$, 16 $nm^2$, 17 $nm^2$, 18 $nm^2$, 19 $nm^2$, 20 $nm^2$, 21 $nm^2$, 22 $nm^2$, 23 $nm^2$, 24 $nm^2$, 25 $nm^2$, 26 $nm^2$, 27 $nm^2$, 28 $nm^2$, 29 $nm^2$, 30 $nm^2$, 31 $nm^2$, 32 $nm^2$, 33 $nm^2$, 34 $nm^2$, 35 $nm^2$, 36 $nm^2$, 37 $nm^2$, 38 $nm^2$, 39 $nm^2$ or 40 $nm^2$. Those skilled in the art will understand that protected areas of the invention also include all sizes larger than, smaller than or in between the above exemplary areas.

A variety of protecting reagents are well known in the art and can be equally employed in the methods of the invention. Particularly useful protecting reagents include, for example, wax or oil droplets applied from a micro dispenser, chrome or other light absorbing or reflecting masks such as those described in U.S. Pat. No. 6,949,638, which is incorporated herein by reference, tape or other adhesives, solder, or polymeric compounds.

In order to provide for targeted immobilization to the anchor sites it is beneficial to modify the unprotected substrate area. A range of modifications can be employed to, for example, make these substrate regions unreactive or confer a lower affinity toward biopolymers (e.g., confer a hydrophobic character) or to impart the same or a different chemical reactivity for attachment of secondary or other biopolymers. In one embodiment, the unprotected regions of the modified substrate surrounding each protected discrete anchor site are further modified to render these regions unreactive to a target biopolymer. The protecting reagent is then removed to yield a substrate having discrete functionalized sites and a surrounding area of each feature that is unreactive to deposited biopolymers. A population of biopolymers can be applied to the substrate for construction of a microarray of the invention. Each anchor site will immobilize a single biopolymer as described above. The surrounding area will be devoid of biopolymer due to its non-reactivity or affinity to the biopolymer. Depositing and/or localization of single biopolymer molecules to each functionalized discrete feature can be performed as described previously with other substrate configurations of the invention.

In another embodiment, the unprotected regions of the modified substrate surrounding each protected discrete anchor site are further modified to render these regions reactive to a secondary biopolymer. Further modification can be performed as an independent modification step as exemplified below. Alternatively, such further modification can be performed on, for example, the non-reactive surrounding areas simultaneous with attachment of, for example, secondary biopolymers. Given the teachings and guidance provided herein, those skilled in the art will understand that the selection of which route to proceed will depend on the substrate modification and the available chemistry that is compatible with the modified substrate and the target biopolymer.

With reference to further modification of the unprotected substrate areas for purposes of exemplification, each protected single anchor site can be further surrounded by, for example, a region of secondary anchor sites modified for attachment of secondary biopolymers. The secondary anchor sites can have a chemical reactivity different from the primary anchor site such that once the protecting reagent is removed the primary and secondary biopolymers can be differentially attached to the primary and secondary anchor sites, respectively. Alternatively, the secondary anchor sites can be modified, for example, with reactive groups that can be activated by an external stimulus as described previously (i.e. made chemically reactive by an additional step such as exposure to light). Employing differential chemical reactivity or activation, for example, this surrounding area can capture a wide variety of secondary biopolymers for use in conjunction with the single biopolymer molecule once immobilized at some or all of the discrete features.

Any of the methods described previously for producing different chemical reactivities or for modifying layers to impart different affinities for a biopolymer also can be employed for producing the discrete features or areas surrounding the protected discrete features. Another particularly useful method for producing a modified substrate with a reactive reagent and further modifying the reagent to render unprotected surrounding regions unreactive includes covering the substrate with a trichlorotriazine layer. Following protection of discrete sites, the substrate can be treated, for example, with ammonia gas to destroy any reactive molecules in the unprotected areas by creating diaminotriazine. The diaminotriazine will still be available to be reactivated for attachment of secondary biopolymers. In this exemplary embodiment of the invention, the protected sites contain trichlorotriazine as the modified substrate component while the unprotected regions have an unreactive diaminotriazine modified substrate. Biopolymers can be generated having aldehyde moieties specifically reactive with either the trichlorotriazine or diaminotriazine moieties using compatible chemistry well known in the art. An alternative method includes further activation of the diaminotriazine regions with bromoacetic acid. The bromoacetic acid in turn can bind to the secondary biopolymers for immobilization at secondary anchor sites.

Secondary biopolymers can be employed in conjunction with the primary single biopolymer molecule for a variety of different analyses and procedures. Particularly useful purposes for such secondary biopolymers include anchoring primers or templates for amplification of nucleic acid biopolymers. Accordingly, in some embodiments of the invention secondary biopolymers include, for example, probes, templates and/or short pieces of nucleic acid used for a variety of nucleic acid amplification processes including, bridge amplification. Bridge amplification localizes the target and one or more primers within sufficient proximity so that complementary sequences hybridize. Following hybridization, the single stranded regions are extended with, for example, a template directed nucleic acid polymerase to modify each molecule to include the sequence of the extension product. Multiple rounds of this extension procedure will result in the synthesis of a population of amplicons. Bridge amplification can be carried out using methods set forth in further detail below or otherwise known in the art such as those described in U.S. Pat. No. 7,115,400, which is incorporated herein by reference. Because the target nucleic acid and the probe or primer is immobilized at a feature and its adjacent surrounding area, the amplicons become highly localized and concentrated at the area of the discrete feature.

One useful variation of bridge amplification includes incorporating a common priming region sequence into the target biopolymer and incorporating a complementary common primer sequence into a plurality of secondary nucleic acids immobilized to the secondary regions surrounding each of the discrete functionalized features of the substrate. The common priming region is typically the same for a plurality of different features on an array thereby allowing for priming of all bridge amplification reactions using a single primer and extension into at least a portion of each of the plurality of different target nucleic acid molecules. Utilization of a common primer sequence complementary to a portion of the secondary nucleic acids is particularly useful because it requires a population of only a single secondary nucleic acid species for amplification of the entire plurality of different primary biopolymers, having different target nucleotide sequences, each attached at a different discrete feature. Accordingly, microarrays can be constructed having a single species of secondary nucleic acids and a diverse plurality of target nucleic acids. However, each of the different single molecules can be amplified by extending the common primer sequence into each of the different species of primary nucleic acids to generate a diverse population of amplicons discretely located at different features throughout an array of the invention. As a result each feature will have a many copies of a particular species of nucleic acid and the species at each site will differ from the species at other sites.

Bridge amplification is particularly useful with the microarrays of the invention because primers can be captured in specific locations for the production of higher density arrays as compared to random spacing or localization of capture locations. Bridge amplification employing the substrates and microarrays of the invention also significantly reduces background noise in subsequent detection and analysis methods. Typically, bridge amplification results in outward spreading of amplicons away from the location where the initial target nucleic acid is attached. If the locations of the initial targets are randomly spaced then a fraction of these locations will be so close that this outward spreading causes unwanted overlap of amplified features. However, ordered spacing of the features where initial target nucleic acids are attached reduces the possibility of merging of amplicon colonies through growth.

Given the teaching and guidance provided herein, those skilled in the art will understand that there is no particular order for attachment of the primary biopolymer at a functionalized feature and attachment of secondary biopolymers, if any, at the surrounding areas. In some embodiments, it may be beneficial to attach the target biopolymer at discrete features first to reduce possible loss through specific or non-specific interactions with the secondary biopolymers. However, any of a variety of procedures well known in the art can be utilized to minimize such interactions including, for example, performing the attachment under conditions that disfavor such interactions such as utilizing stringent temperature and solute conditions. Generally, following modification of the secondary areas surrounding the functionalized features, the protective reagent such as wax, oil or other mask is removed using methods well known in the art. One exemplary method includes, for example, washing the protected substrate with an organic solvent. The substrate is now ready for deposition of target biopolymers and immobilization. Immersion into a solution of biopolymer molecules can be performed to achieve this step. Due to the size of the now unprotected and active discrete features on the surface, only about one molecule will be captured at each feature. The captured target biopolymer molecules can be covalently immobilized by chemical coupling. The microarray is now available for use directly in an assay procedure or, alternatively, secondary biopolymers can be attached to the secondary anchor sites for employment in procedures such as described above.

Following the above teachings and guidance, those skilled in the art can employ the methods of the invention to fabricate a microarray having plurality of biopolymer molecules each attached at a discrete feature on a substrate. As with the previously exemplified substrates of the invention, the functionalization of discrete sites to produce discrete features also can be employed to generate substrates having optimally packed features to maximize the used surface area and the signal-to-noise ratio when a microarray produced therefrom is employed in a subsequent assay. In this respect, a large plurality of biopolymers can be deposited and immobilized throughout optimally spaced discrete features such that maximum signal can be generated with minimum noise derived from adjacent features.

In yet a further specific embodiment, nucleic acid molecules are positioned in precise locations on a substrate using nanomaterials that allow for the controlled manipulation of many single molecules in parallel. In this particular embodiment, a high density sample of nucleic acids can be simultaneously guided into nanochannels by, for example, application of an electric potential to achieve a single molecule per channel. Nanochannels having a diameter of about 100 nm can physically exclude more than one nucleic acid from entering. Once encased by the nanochannel, a substrate is placed on the initial opening and the single molecules are deposited in a pattern mirroring the pattern of nanochannels upon application of a force in the reverse direction.

Also provided by the invention is another method of fabricating a microarray. The method includes: (a) contacting a substrate having a plurality of discrete nanochannels and an electrode material orthogonal to said nanochannels with a plurality of biopolymers, said nanochannels having a length and diameter sufficient for entry of only a single biopolymer molecule; (b) applying an electric potential to said substrate sufficient to translocate said single biopolymer molecules into said nanochannels to produce a substrate containing a plurality of single biopolymers each in said plurality of discrete nanochannels, and (c) transferring said plurality of single biopolymers contained in said plurality of discrete nanochannels to a solid support.

In this specific embodiment of the invention, microarrays can be fabricated by loading individual biopolymer molecules into a plurality of discrete nanochannels. The nanochannels can be organized at essentially any desired spacing and density, limited only by their outer diameter. The pattern and density of the nanochannels will be a template to microarrays produced therefrom. Particularly useful patterns and densities include nanochannels optimally spaced to achieve a maximum density of biopolymer molecules and a maximum signal-to-noise ratio with minimum bleed-over of signal from adjacent features within the microarray as described previously.

A variety of different methods can be employed to load single biopolymer molecules into a plurality of discrete nanochannels. One method includes, for example, applying an electric potential at the distal end of the plurality to produce a force that translocates the biopolymers into the nanochannels. Depending on the selected biopolymer the electric potential can differ. For example, nucleic acids exhibit a net negative charge due to their phosphodiester backbone. Therefore, the anode of an electrolytic cell can be placed at the distal end of the plurality with the cathode at the proximal or entrance for loading. Applying such an electric potential will draw the plurality of nucleic acid biopolymers toward the distal end of the nanochannels. Each opening of a nanochannel will allow a single molecule to enter until translocation to the distal end is complete. Once complete, the electric potential is terminated and the loaded plurality of nanochannels is ready to be transferred onto a substrate of choice for fabrication of a microarray.

Voltage applicable to apply a sufficient electric potential to draw a biopolymer into a nanochannel will typically include those voltage ranges employed in electrophoresis methods. Such electrophoresis methods include, for example, agarose gel electrophoresis, polyacrylamide gel electrophoresis, capillary gel electrophoresis and pulse-field gel electrophoresis. Voltages can range from between about 5-400 volts per cm of path length. Particular voltage ranges include, for example, between about 1-5, 6-10, 11-15, 16-20, 21-25, 26-30, 31-35, 36-40, 41-45, 46-50, 51-55, 56-60, 61-65, 66-70, 71-75, 76-80, 81-85, 86-90, 91-95, 96-100, 101-105, 106-110, 111-115, 116-120, 121-125, 126-130, 131-135, 136-140, 141-145, 146-150, 151-155, 156-160, 161-165, 166-170, 171-175, 176-180, 181-185, 186-190, 191-195, 196-200 and 201 or more volts per cm of path length. All values within, above and below these exemplary ranges also can be used to load a biopolymer into a nanochannel of the invention. The electric potential is influenced by solutes within a buffer. For a review of the relationship between electrical parameters in electrophoresis see, for example, "Physical Chemistry: Applications to Biochemistry and molecular Biology" Freifelder, D., 2nd Edition, W.H. Freeman and Co., 1982. Buffers that can be employed for loading a biopolymer into a nanochannel of the invention also include, for example, those typically employed for electrophoresis. Exemplary buffers include Tris-Acetate EDTA (TAE) and Tris-Borate EDTA (TBE), for example.

Other methods that can be utilized to load a single biopolymer molecule within a population each into a single nanochannel within a plurality include, for example, centrifugation such that the g force is parallel to the length of the nanochannels or fluid flow in a direction through the nanochannels.

The internal diameter of each nanochannel should be sufficient to allow passage of a single biopolymer into a nanochannel and exclude, by size limitation, entrance of additional biopolymers. Generally, nanochannels useful for fabrication of microarrays containing nucleic acid biopolymers will have an average internal diameter ranging from about 0.005-0.05 µm. Particularly useful internal diameters include, for example, about 0.006 µm, 0.007 µm, about 0.008 µm, about 0.009 µm, about 0.01 µm, about 0.02 µm, about 0.03 µm, about 0.04 µm or about 0.045 or more. Those skilled in the art will understand that internal diameters of nanochannels used in the invention also include all sizes in between, smaller and greater than the above exemplary sizes. Given the teachings and guidance provided herein, those skilled in the art also will understand that the average internal diameter of nanochannels can vary depending on the type of biopolymer to be applied. For example, polypeptide biopolymers can require somewhat larger internal diameters for efficient translocation due to bulky side chains on some amino acids. Accordingly, the diameters exemplified above can be adjusted based on such known or other empirically determined characteristics.

Similarly, the average length of each nanochannel should be sufficient to allow entrance of an entire single biopolymer into a nanochannel and exclude, by preclusion through occupation, entrance of additional biopolymers. Generally, nanochannels useful for fabrication of microarrays containing nucleic acid biopolymers will have lengths ranging from about 1.0-3.0 µm. Particularly useful lengths include, for example, about 1.1 µm, 1.2 µm, 1.3 µm, 1.4 µm, 1.5 µm, 1.6 µm, 1.7 µm, 1.8 µm, 1.9 µm, 2.0 µm, 2.1 µm, 2.2 µm, 2.3 µm, 2.4 µm, 2.5 µm, 2.6 µm, 2.7 µm, 2.8 µm, 2.9 µm, 3.0 µm or more. Those skilled in the art will understand that nanochannel lengths of the invention also include all sizes in between, smaller and greater than the above exemplary sizes. Given the teachings and guidance provided herein, those skilled in the art also will understand that the actual length of a nanochannel can vary depending on the size of biopolymer to be applied. For example, longer nucleic acid sequences can be used with channels having larger lengths compared to shorter nucleic acids for partial or complete translocation into a nanochannel. Similarly, shorter nucleic acids can be used with channels having shorter lengths to avoid loading a second molecule in tandem into nanochannels longer than the first molecule. Accordingly, the lengths exemplified above can be adjusted based on such known or other empirically determined characteristics.

By way of exemplification for applying a translocation force as described above, a plurality of discrete nanochannels is configured to contain an electrode material orthogonal to the long axis of each nanochannel within the plurality. Such configurations can include, for example, metal or other conductive material bonded to the distal end of each nanochannel. Bonding includes, for example, temporary or permanent attachment of the electrode material. The electrode material should span the opening of the nanochannel so as to preclude complete translocation of the biopolymer through the nanochannel and passage into solution at the distal end. Alternatively, a conductive or semi-porous material can be placed in between the electrode and opening to stop translocation at the distal end.

Transfer of biopolymers from their loaded state within a nanochannel to a substrate can be performed using a variety of methods well known in the art. For example, forces applied using electrical potential, centrifugal force, vacuum applied and pressure can be employed to pull or force each of the plurality of biopolymers out of its nanochannel and onto a substrate. By way of exemplification, a substrate can be placed or affixed onto the proximal or loading end of the plurality of nanochannels and an electric potential can be applied in the opposite orientation to that used for loading biopolymers into the nanochannels. Once applied, the biopolymers will translocate in the opposite direction and proceed out of the nanochannels. The affixed substrate will catch each biopolymer in a location corresponding to the terminus of each nanochannel. The biopolymers applied to the substrate can be used directly or covalently attached prior to use as a microarray of the invention.

Nanochannels can be constructed using a variety of materials and methods well known in the material science art. For example, nanochannels can be bored, grooved or constructed out of, silicon, using chemical or abrasive methods described previously herein in regard to polishing. A particularly useful method for constructing a plurality of nanochannels applicable for fabricating the microarrays of the invention includes boring out a plurality of fiber optic fibers to leave only the cladding. The inner region can be bored out by acid treatment as described, for example, in U.S. Pat. No. 6,859,570 or U.S. Pat. No. 6,266,459, each of which is incorporated herein by reference. Physical boring can also be used. Each plurality of cylindrical cladding devoid of its optical fiber can be cut to a desired length and utilized as a plurality of nanochannels. Another particularly useful means to produce a plurality of discrete nanochannels is to employ capillary arrays. Capillary arrays are well known in the art and, given the teachings and guidance provided herein, can be readily modified by, for example, attachment of an electrode material at one set of termini. Loading and unloading of bored out fiber optic cladding or capillary arrays can be performed as described previously.

It is understood that modifications which do not substantially affect the activity of the various embodiments of this invention are also included within the definition of the invention provided herein. Accordingly, the following examples are intended to illustrate but not limit the present invention.

Throughout this application various publications have been referenced within parentheses. The disclosures of these publications in their entireties are hereby incorporated by reference in this application in order to more fully describe the state of the art to which this invention pertains.

Although the invention has been described with reference to the disclosed embodiments, those skilled in the art will readily appreciate that the specific examples and studies detailed above are only illustrative of the invention. It should be understood that various modifications can be made without departing from the spirit of the invention. Accordingly, the invention is limited only by the following claims.

What is claimed is:

1. A method of fabricating a microarray, comprising:
   (a) functionalizing a substrate having wells to introduce chemical modifications within said wells and surrounding said wells, the functionalizing involving:
      reacting a reagent, selected from the group consisting of trichloro alkyl silane and trichlorosilane, with said substrate to create a modified substrate surface; and
      attaching primer nucleic acids to the modified substrate surface, wherein the primer nucleic acids are complementary to a target nucleic acid;
      wherein the chemical modifications include the modified substrate surface and the primer nucleic acids attached thereto;
   (b) polishing, using mechanical treatment, said substrate to produce a polished surface surrounding said wells, whereby said chemical modifications surrounding said wells are removed and said chemical modifications within said wells are retained; and
   (c) depositing said target nucleic acid onto said substrate, wherein higher affinity of said chemical modifications within said wells, compared to said polished surface, to said target nucleic acid facilitates localization of said target nucleic acid within said wells, wherein said affinity comprises complementarity of said primer nucleic acids to said target nucleic acid.

2. The method of claim 1, wherein said substrate comprises silicon, and wherein prior to the functionalizing, the method further comprises converting at least a portion of the silicon to silicon dioxide.

3. The method of claim 1, wherein said target nucleic acids comprise genomic DNA fragments.

4. The method of claim 1, wherein said depositing comprises deposition of a single target nucleic acid molecule within each of said wells.

5. The method of claim 4, further comprising amplifying the single nucleic acid molecule within each of said wells.

6. The method of claim 1, wherein said target nucleic acid comprises a plurality of target nucleic acids including target sequences that are different from each other and common priming region sequences, and wherein said depositing comprises hybridizing said common priming region sequences of said plurality of target nucleic acids to said primer nucleic acids that are attached to said modified substrate surface within said wells.

7. The method of claim 5, wherein said amplifying comprises bridge amplification.

8. The method of claim 1, wherein said substrate comprises at least 500,000 of said wells within 1.28 cm$^2$.

9. The method of claim 1, wherein said mechanical treatment comprises contacting an abrasive surface with said substrate.

10. The method of claim 1, wherein said mechanical treatment comprises contacting a slurry or suspended aggregate with said substrate.

11. The method of claim 1, wherein said wells have a depth between 0.1 μm and 10 μm.

12. The method of claim 1, wherein said wells have a diameter between 0.1 μm and 10 μm.

13. The method of claim 1, wherein said polished surface surrounding said wells is hydrophobic.

14. The method of claim 2 wherein the polished surface surrounding said wells comprises the silicon.

15. A method of fabricating a microarray, comprising:
(a) treating a substrate having wells to form a modified substrate surface within said wells and surrounding said wells, the treating involving reacting a reagent, selected from the group consisting of trichloro alkyl silane and trichlorosilane, with said substrate;
(b) polishing, using mechanical treatment, said substrate to produce a polished surface surrounding said wells, whereby said modified substrate surface surrounding said wells is removed and said modified substrate surface within said well is retained;
(c) attaching primer nucleic acids to said modified substrate surface within said wells, wherein the primer nucleic acids are complementary to a target nucleic acid; and
(d) depositing said target nucleic acid onto said substrate, wherein an affinity of said primer nucleic acids within said wells to said target nucleic acid is higher than an affinity of said polished surface to said target nucleic acid, and wherein the higher affinity facilitates localization of said target nucleic acid within said wells.

* * * * *